(12) United States Patent
Nojima et al.

(10) Patent No.: US 8,373,947 B1
(45) Date of Patent: Feb. 12, 2013

(54) MAGNETIC HEAD SLIDER INCLUDING PROTECTIVE FILM FOR HEAD-TO-MEDIUM SPACING DETECTING ELEMENT

(75) Inventors: Tatsuhiro Nojima, Tokyo (JP); Masashi Sano, Tokyo (JP); Yosuke Antoku, Tokyo (JP); Mutsumi Fujita, Tokyo (JP); Isamu Toba, Tokyo (JP); Norio Takahashi, Tokyo (JP); Hideyuki Ukita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/248,590

(22) Filed: Sep. 29, 2011

(51) Int. Cl.
*G11B 5/39* (2006.01)
(52) U.S. Cl. .................................................. 360/234.1
(58) Field of Classification Search ................. 360/234.1
See application file for complete search history.

(56) References Cited

U.S. PATENT DOCUMENTS

| | | | | |
|---|---|---|---|---|
| 7,265,948 B2 * | 9/2007 | Hoshiya et al. | .......... | 360/324.12 |
| 7,275,304 B2 * | 10/2007 | Sakai et al. | ................ | 29/603.08 |
| 7,283,337 B2 * | 10/2007 | Sakai et al. | .............. | 360/324.12 |
| 7,428,128 B2 * | 9/2008 | Hasegawa et al. | ........ | 360/324.11 |
| 7,495,868 B2 * | 2/2009 | Seino et al. | .............. | 360/324.11 |
| 7,589,928 B2 | 9/2009 | Roy et al. | | |

* cited by examiner

*Primary Examiner* — Mark Blouin
(74) *Attorney, Agent, or Firm* — Posz Law Group, PLC

(57) ABSTRACT

A magnetic head slider includes a magnetic recording part and/or a reproducing part. The magnetic head slider includes a resistance film having temperature dependence of electrical resistance, the resistance film being positioned in the vicinity of an air bearing surface or on the air bearing surface, separately from the magnetic recording part and the reproducing part. The magnetic head slider further includes a first protective film with a smaller milling rate than the resistance film, the first protective film contacting a lower surface of the resistance film in a lamination direction of the magnetic head slider and on the air bearing surface, and/or a second protective film with a smaller milling rate than the resistance film, the second protective film contacting an upper surface of the resistance film in the lamination direction of the magnetic head slider and on the air bearing surface.

14 Claims, 9 Drawing Sheets

MAGNETIC HEAD SLIDER INCLUDING PROTECTIVE FILM FOR HEAD-TO-MEDIUM SPACING DETECTING ELEMENT

BACKGROUND OF THE INVENTION

1. Field of the Invention

The present invention relates to a magnetic head slider, and more particularly, to a magnetic head slider including a head (magnetic head)-to-medium (recording medium) spacing detecting element.

2. Description of the Related Art

In a hard disk device, a magnetic head slider on which a magnetic head is mounted is arranged facing the surface of a rotating recording medium (magnetic disk) with a space therebetween, and it performs the writing of information to the recording medium and/or the reading of information from the recording medium. In recent years, a flying height from the recording medium of the magnetic head slider is extremely small to respond higher recording density of the recording medium and is set, for example, at or below 10 nm.

In the case where the flying height of the magnetic head slider is minute, when the flying height of the magnetic head slider fluctuates for some reason, or an unexpected projection exists on the surface of the recording medium, there is the potential that the magnetic head slider is made to contact the surface of the recording medium and causes damage. For this reason, the magnetic head slider is preferably controlled so as not to contact the recording medium.

The flying height of the magnetic head slider depends on the shape (rail shape, arrangement, or the like) of an air bearing surface, the relative speed of the magnetic head slider and recording medium, and the hard disk device usage environment (pressure and temperature) or the like. In the past, the flying height of the magnetic head slider has been adjusted by optimizing mainly the shape of the air bearing surface; however, the flying height cannot be controlled during operation with this technique. Accordingly, the flying height is set to make an allowance to some extent, so that the magnetic head slider does not contact the surface of the recording medium, or the contact does not frequently occur. In contrast to this, a magnetic head slider with a built-in heater has been developed in recent years, and this enables the flying height to be controlled during operation by operating the heater to expand the air bearing surface toward the recording medium.

The latter technique is effective to reduce the flying height; however, in order to adequately control the flying height, a space between the magnetic head slider and the surface of the recording medium (head-to-medium spacing (HMS)) is preferably measurable during operation. Even with the former technique, there is an occasion that the HMS is preferably measured during operation of the hard disk device or a test device for a trial objective.

U.S. Pat. No. 7,589,928 discloses a magnetic head slider that can measure the HMS. In the magnetic head, a sensor (hereinafter, refer to as HMS detecting element) for detecting HMS is provided separately from a magnetic recording part and a reproducing part. The HMS detecting element has a metallic film formed of platinum or gold. Current flows into the HMS detecting element and a voltage drop in the HMS detecting element is measured. The voltage drop is converted to HMS by the known Wallace equation. The specification also described that the HMS detecting element is covered with a tantalum film to prevent from damage by the HMS detecting element contacting the recording medium.

In a manufacturing process of the magnetic head slider, a polishing treatment and a milling treatment are conducted to form an air bearing surface. Although these treatments may be concurrently used, the air bearing surface is ultimately formed by the milling. The milling rate differs according to the material being milled, so the air bearing surface after milling is not completely flat and minute asperity is formed. Because the HMS detecting element is positioned on the air bearing surface, it is polished together with the magnetic recording part and the reproducing part. Because the HMS detecting element is a metallic film, it is generally easy to mill and there is a greater likelihood for it to be recessed compared to other portions of the air bearing surface after milling. When this occurs, there is a greater distance between the HMS detecting element and the recording medium which presents a likelihood of reducing the sensitivity of the HMS detecting element.

SUMMARY OF THE INVENTION

An object of the present invention is to provide a magnetic head slider that can prevent the reduction in sensitivity of the HMS detecting element caused by the polishing of the air bearing surface.

The magnetic head slider that relates to one embodiment of the present invention is provided with at least one of a magnetic recording part or a reproducing part. Separately from the magnetic recording part and the reproducing part, the magnetic head slider has a resistance film with temperature dependence of electrical resistance that is positioned in the vicinity of the air bearing surface or on the air bearing surface. The magnetic head slider further has at least one of a first protective film with a smaller milling rate than the resistance film, the first protective film being positioned contacting the lower surface of the resistance film in the lamination direction of the magnetic head slider and also on the air bearing surface, and a second protective film with a smaller milling rate than the resistance film, the second protective film being positioned contacting the upper surface of the resistance film in the lamination direction of the magnetic head slider and also on the air bearing surface.

According to another embodiment, a magnetic head slider has at least one of a first protective film with a smaller milling rate than the resistance film, the first protective film being positioned contacting the lower surface of the resistance film in the lamination direction of the magnetic head slider and also on the air bearing surface, and a second protective film with a smaller milling rate than the resistance film, the second protective film being positioned contacting the upper surface of the resistance film in the lamination direction of the magnetic head slider and also on the air bearing surface.

Further, according to another embodiment, at least a part of the periphery of the resistance film on the air bearing surface is covered by the protective film with a smaller milling rate than the resistance film.

For the resistance film, at least the lower surface or upper surface of the resistance film is protected by the first or the second protective film. Accordingly, the resistance film is prevented from being excessively polished at the time of polishing. This enables the resistance film after being polished to be closer to the recording medium, and the reduction in sensitivity of the HMS detecting element can be prevented.

In this manner, the present invention can provide a magnetic head slider that can prevent the reduction in sensitivity of the HMS detecting element caused by the polishing of the air bearing surface.

The objective given above as well as other objectives, characteristics, and advantages of the present invention will be evident from the following descriptions with reference to the attached drawings in which the present invention is illustrated.

DETAILED DESCRIPTION OF THE INVENTION

Figure 1:
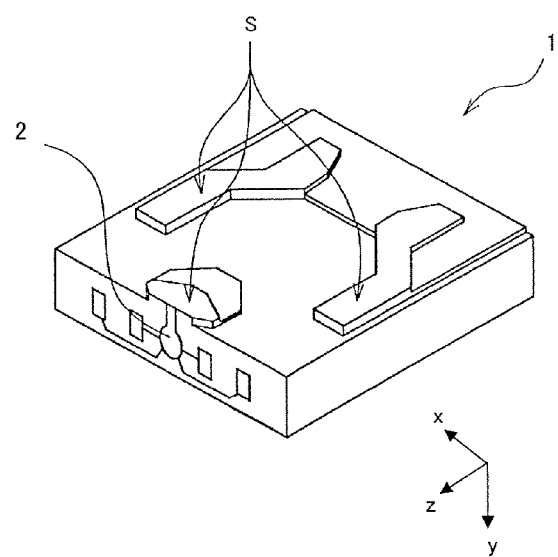
FIG. 1 is a perspective view of a magnetic head slider according to one embodiment of the present invention.

Hereinafter, description will be given of a magnetic head slider 1 of the present invention with reference to drawings. FIG. 1 is a perspective view of the magnetic head slider 1. The magnetic head slider 1 is roughly a hexahedron shape, and one of those surfaces is an air bearing surface S that opposes the recording medium. The magnetic head slider 1 is arranged within a hard disk drive device so as to oppose the recording medium (not illustrated) that is a disk-shaped magnetic disk that is rotationally driven. When the recording medium rotates in the z-direction in FIG. 1, a lifting force is generated in the y-direction in the magnetic head slider 1 by airflow passing between the recording medium and the magnetic head slider 1. The magnetic head slider 1 flies from the surface of the recording medium by the lifting force.

Figure 2:
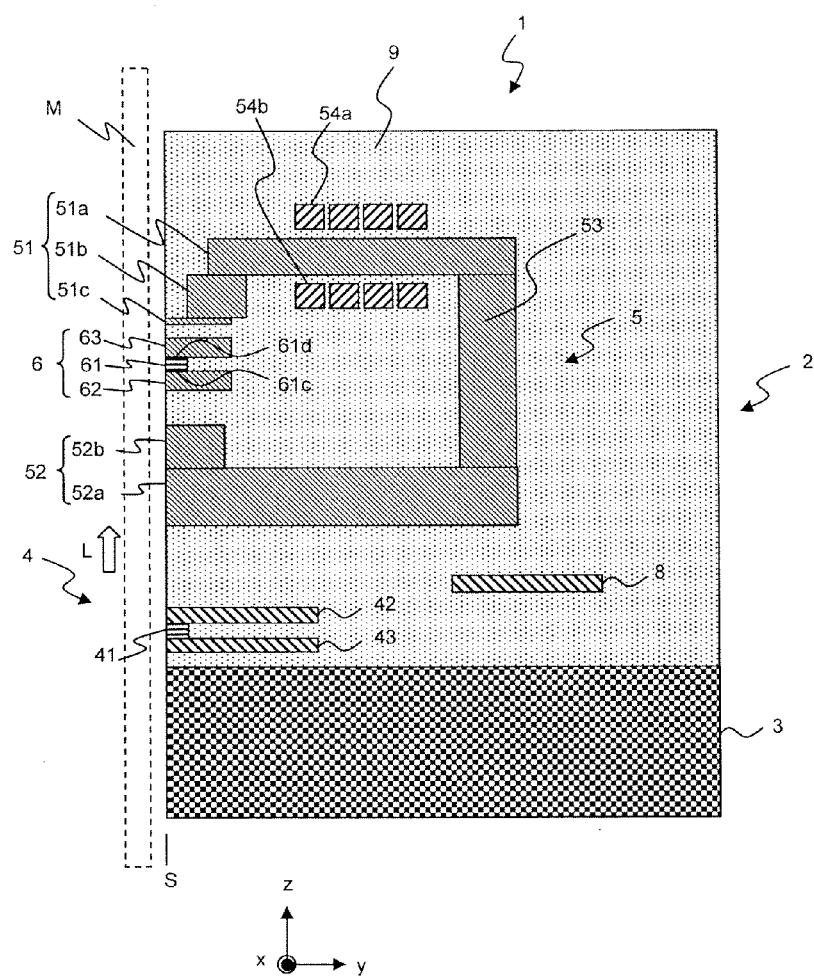
FIG. 2 is a side sectional view of the magnetic head slider illustrated in FIG. 1.

FIG. 2 is an overall cross-sectional view of the magnetic head slider. In the present specification, the lamination direction L means the film formation direction in the wafer process and corresponds to the z-direction in each drawing. The "upward lamination direction (upper side in the lamination direction)" means the direction toward an overcoat layer 9 from a substrate 3, and the "downward lamination direction (lower side in the lamination direction)" means the direction toward the substrate 3 from the overcoat layer 9 respectively.

The magnetic head slider 1 has the substrate 3 and a magnetic head 2 formed on the substrate 3, and the magnetic head 2 has a reproducing part 4 including an MR element 41, and a magnetic recording part 5 including a main pole 51 for recording. In other embodiments, the magnetic head 2 may be provided with only one of the magnetic recording part 5 and the reproducing part 4.

The reproducing part 4 has the magneto resistive (MR) element 41 positioned so that its tip part is exposed to the air bearing surface S, and an upper shield layer 42 and a lower shield layer 43 provided so as to sandwich the MR element 41 from above and below in the lamination direction. The MR element 41 can be applied to any configuration that utilizes a magneto resistive effect such as a current in plane (CIP)—gigantic magneto resistive (GMR) element in which a sense current flows in a parallel direction (x-direction) to the film surface, a current perpendicular to plane (CPP)—gigantic magneto resistive (GMR) element in which a sense current flows in a perpendicular direction (z-direction) to the film surface, a tunneling magneto resistive (TRM) element that utilizes a tunnel effect, or the like. When a CPP-GMR element and a TMR element are applied, the upper shield layer 42 and the lower shield layer 43 are used as electrodes to supply sense currents.

The magnetic recording part 5 has the main pole 51 for perpendicular magnetic recording. The main pole 51 has a first main body part 51a, a second main body part 51b, and a pole tip part 51c, and these are formed of an alloy, composed of any two or three of Ni, Fe, and Co, or the like. The end part of the pole tip part 51c is positioned on the air bearing surface S. A return shield layer 52 is provided on the lower side in the lamination direction of the main pole 51. The return shield layer 52 has a first main body part 52a and a second main body part 52b, and these are also formed of an alloy, composed of any two or three of Ni, Fe, and Co, or the like. The main pole 51 and the return shield layer 52 are magnetically linked to each other via the contact part 53. The overcoat layer 9 composed of $Al_2O_3$ is provided on the upper side in the lamination direction of the main pole 51.

Coils 54a and 54b are wound around the main pole 51 with the contact part 53 in the center. FIG. 2 illustrates only a portion of the air bearing surface S side from the contact part 53. The coils 54a and 54b are formed of an electrical conducting material such as Cu or the like. The coils 54a and 54b are provided in a double-layer in the present embodiment; however a single-layer or a triple-layer may be used. Further, the number of windings is 4 windings in the present embodiment, but it is not limited to this.

A magnetic flux is generated in the main pole 51 by the current that is externally applied to the coils 54a and 54b. The magnetic flux generated inside the main pole 51 narrows as it moves toward the air bearing surface S, and is discharged as a writing magnetic flux that is minute, strong, and compatible of high recording density from the pole tip part 51c positioned on the air bearing surface S to the recording medium M. The magnetic flux discharged from the pole tip part 51c enters in the recording medium M and magnetizes each bit in the perpendicular direction. The magnetic flux changes its magnetic path to the in-plane direction (z-direction) of the recording medium M, and further changes the direction again to be perpendicular in the vicinity of the return shield layer 52 and is absorbed by the return shield layer 52.

The magnetic head 2 is provided with a heater 8. The heater 8 is provided inside the magnetic head 2 and heats the magnetic head 2 to be thermally expanded and makes the air bearing surface S project toward the recording medium M. The heater 8 includes a heating conductor composed of Cu, Ni, Cr, or the like and an insulating layer to cover thereover (both not illustrated), and the heating conductor generates heat by current supplied from the outside of the magnetic head slider 1. There is no particular restriction for the setting position of the heater 8; however, because the main pole 51 and the MR element 41 need to be near the recording medium M as much as possible by the thermal expansion of the magnetic head 2, it is preferred that the heater 8 is somewhere in the middle between the main pole 51 and the MR element 41.

Figure 3A:
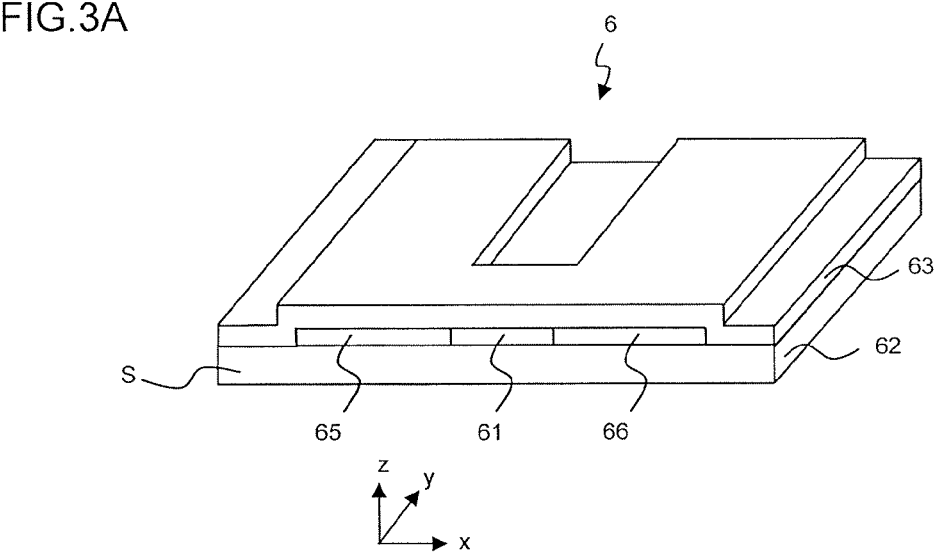
FIGS. 3A and 3B are perspective views illustrating a configuration of a HMS detecting element.
Figure 3B:
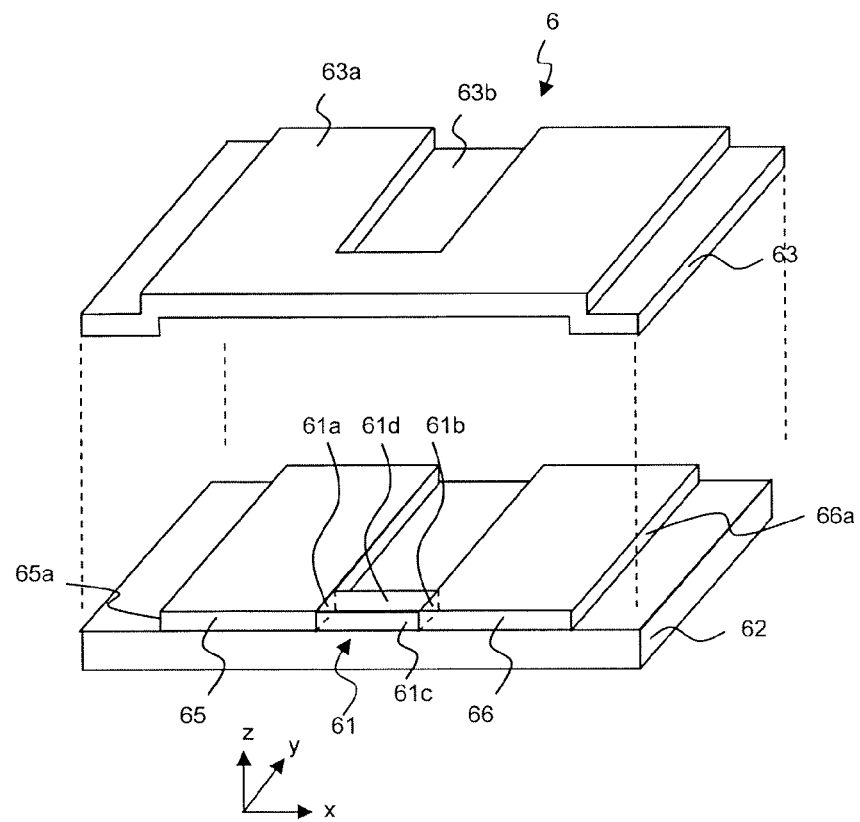

The magnetic head 2 is provided with an HMS detecting element 6. FIG. 3A is a perspective view of the HMS resistive element 6. FIG. 3B is an exploded perspective view of the HMS detecting element 6 which illustrates a resistance film 61 and electrode films 65 and 66 to be described below. The HMS detecting element 6 includes the resistance film 61, a pair of electrode films 65 and 66 that is electrically connected to the resistance film 61. The pair of electrode films 65 and 66 is respectively connected electrically to the resistance film 61 through both lateral surfaces 61a and 61b of the resistance film 61 in the track width direction (x-direction) of the magnetic head 2. The resistance film 61 faces the air bearing surface S in the present embodiment; however, it may be positioned at a distance from the air bearing surface S, which is to say, in the vicinity of the air bearing surface S. The electrode films 65 and 66 also face the air bearing surface S in the present embodiment; however, they may be placed with a space from the air bearing surface S, and further it may be more recessed from the air bearing surface S than the resistance film 61.

The resistance film 61 and the electrode films 65 and 66 are composed of a metallic film that contains a metal as a main component selected from a group including nickel, titanium, tungsten, platinum, tantalum, ruthenium, and gold, or a metallic film that contains two or more elements selected from the above-described group as main components, or a lamination film that contains these metallic films. Here, in the present specification, main component means that 50 or more percent by mole fraction of the above-described material is contained (total of corresponding mole fractions when two or more of the above-described elements are contained). Material for the resistance film 61 and the electrode films 65 and 66 may be the same or different from each other. The electrode films 65 and 66 are connected to electrode pads (not illustrated) of the magnetic head slider 1 through conductors (not illustrated). A current is supplied to the electrode films 65 and 66 from the outside of the magnetic head slider 1 through the electrode pads and the conductors.

The shape of the resistance film 61 on the air bearing surface S is a rectangular shape where the length of the track width direction (x-direction) is longer than the length of the lamination direction (z-direction). The shape of each of the electrode films 65 and 66 on the air bearing surface S is also a rectangular shape where the length of the track width direction (x-direction) is longer than the length of the lamination direction (z-direction).

The HMS detecting element 6 further includes first and second protective films 62 and 63 that sandwich the resistance film 61 and the electrode films 65 and 66 from the upper and lower sides in the lamination direction of the magnetic head 2. Specifically, the first protective film 62 is positioned contacting the lower surface 61c of the resistance film 61 in the lamination direction of the magnetic head 2 and on the air bearing surface S. The second protective film 63 is positioned contacting the upper surface 61d of the resistance film 61 in the lamination direction of the magnetic head 2 and on the air bearing surface S. In the present embodiment, the first protective film 62 and the second protective film 63 are provided together; however, only one of the first protective film 62 and the second protective film 63 may be provided. In an upper surface 63a of the second protective film 63, a center part 63b sags down due to a reason in the manufacturing process; however it may also be formed flat.

The first protective film 62 completely covers the lower surface 61c of the resistance film 61. The second protective film 63 completely covers the upper surface 61d of the resistance film 61, and at the same time completely covers outside lateral surfaces 65a and 66a of the electrode films 65 and 66 respectively in the track width direction. Accordingly, the first and second protective films 62 and 63 completely surround the periphery of the resistance film 61 on the air bearing surface S. However, the second protective film 63 may cover only portions of the outside lateral surfaces 65a and 66a of the electrode films 65 and 66 respectively in the track width direction on the air bearing surface S. Likewise, the first and second protective films 62 and 63 may cover only portions of the lower surface 61c and the upper surface 61d respectively of the resistance film 61 on the air bearing surface S. In other words, at least a portion of the periphery of the resistance film 61 may be covered by the protective film on the air bearing surface S.

The first and second protective films 62 and 63 contain any one, or two or more, of titanium oxide ($TiO_2$), aluminum oxide ($Al_2O_3$), hafnium oxide ($HfO_2$), zirconium oxide ($ZrO_2$), chrome oxide ($Cr_2O_3$), or niobium oxide ($Nb_2O_5$) as the main component. The first and second protective films 62 and 63 have smaller milling rates than the resistance film 61, and preferably have smaller milling rates than all other portions appearing on the air bearing surface S.

Table 1 shows milling rates for main materials that configure the first and second protective films 62 and 63 and the magnetic head 2. The milling rate of the first and second protective films 62 and 63 is particularly preferred to be smaller than the milling rate of the resistance film 61 and is also preferred to be smaller than the milling rate of the main material that configures the magnetic head 2. There is even a possibility of a combination, according to Table 1, that the milling rate of the "configuration material of first and second protective films 62 and 63" is smaller than the milling rate of the "material configuring of magnetic head 2," and a selection is preferable so that the milling rate of the "configuration material of first and second protective films 62 and 63" is smaller than the milling rate of at least the "configuration material of magnetic head 2" in the periphery thereof. $Al_2O_3$ may be able to be used as a protective film depending on the film material in the periphery thereof.

TABLE 1

| Configuration Material of First and Second Protective Films 62 and 63 | | Main Configuration Material of Magnetic Head 2 | |
| --- | --- | --- | --- |
| Material | Milling Rate (nm/sec) | Material | Milling Rate (nm/sec) |
| $TiO_2$ | About 0.05 | FeCo | About 0.12 |
| $Al_2O_3$ | About 0.06 | NiFe | About 0.12 |
| $HfO_2$ | About 0.04 | $Al_2O_3$ | About 0.06 |
| $ZrO_2$ | About 0.06 | Ni | About 0.11 |
| $Cr_2O_3$ | About 0.07 | | |
| $Nb_2O_5$ | About 0.09 | | |

The overcoat layer 9 composed of $Al_2O_3$ is formed on the upper side in the lamination direction of the magnetic recording part 5. Portions of the magnetic head 2 that excludes each of the above-described elements are composed of $Al_2O_3$.

The air bearing surface S preferably projects the most toward the recording medium M in the position of the HMS detecting element 6. More specifically, the air bearing surface S preferably projects the most toward the recording medium M in the direction that is orthogonal to the lamination direction in the portion where one of the resistance film 61, the first protective film 62 and the second protective film 63 is positioned.

Figure 4:
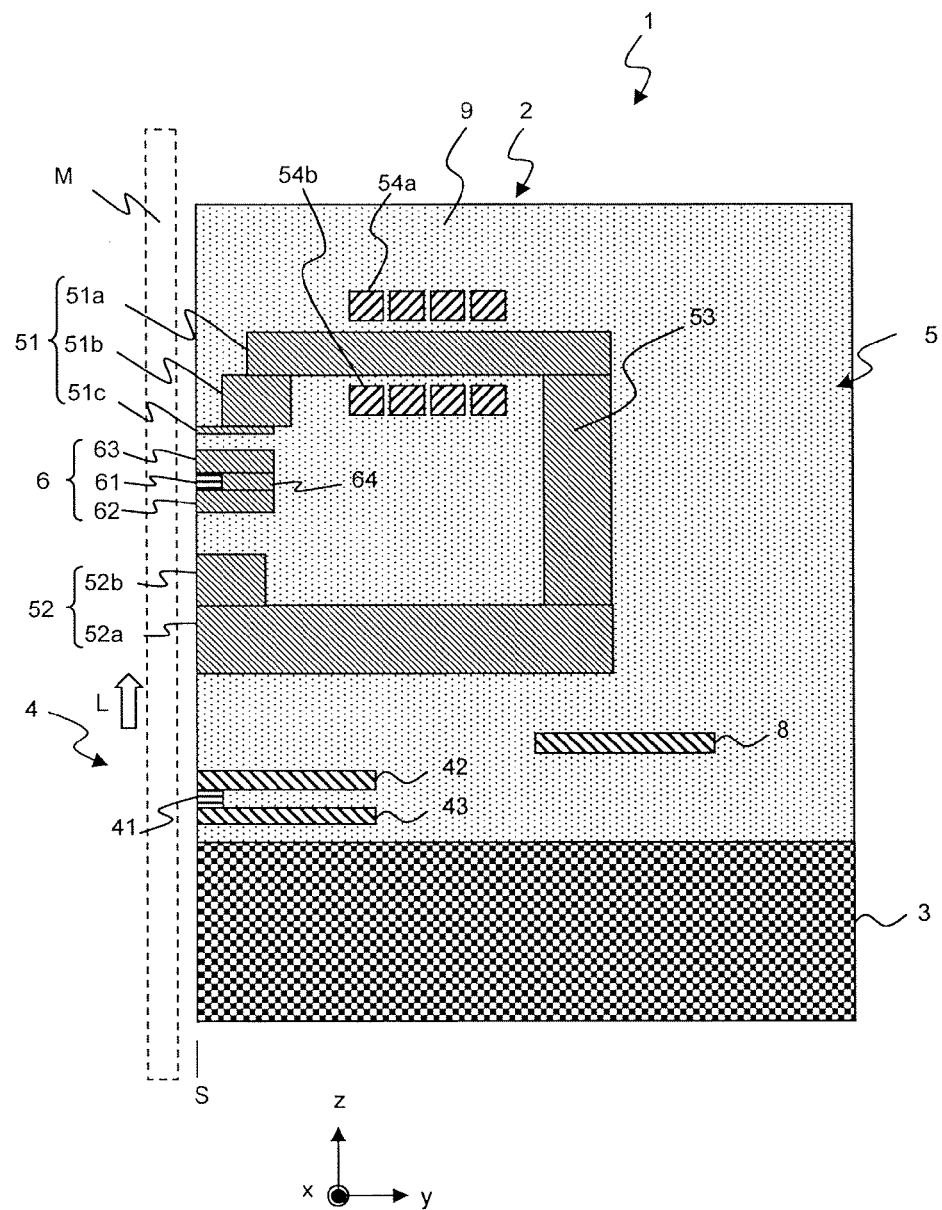
FIG. 4 is a side sectional view of the magnetic head slider according to another embodiment.

As illustrated in FIG. 4, a third protective film 64 may be provided on the back side of the HMS detecting element 6 from the perspective of the air bearing surface S. In such case, the entire surface, except for the air bearing surface S, of the HMS detecting element 6 is covered by the protective films

62, 63, and 64. The third protective film 64 may be formed of a different material from the first and second protective films 62 and 63; however, it may be formed of the same material as the first and second protective films 62 and 63. Particularly, when the second protective film 63 and third protective film 64 are formed of the same material, the second protective film 63 and third protective film 64 may be formed at the same time.

Next, description will be given of a making method the magnetic head slider. First of all, each layer that configures the reproducing part 4 is formed on the substrate (wafer) by sputtering, and each layer that configures the heater 8 is formed. Next, each layer that configures the magnetic recording part 5 is formed by a frame plating method, and at the same time the HMS detecting element 6 is formed by sputtering.

Figure 5A:
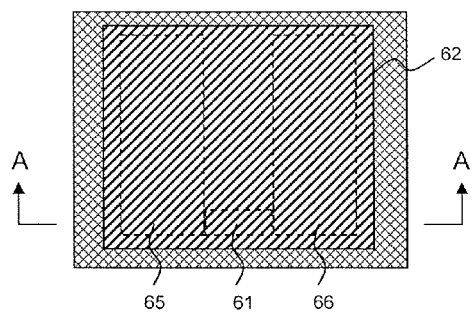
FIGS. 5Aa-5Cb are conceptual diagrams illustrating a manufacturing process of the HMS detecting element.
Figure 5A:
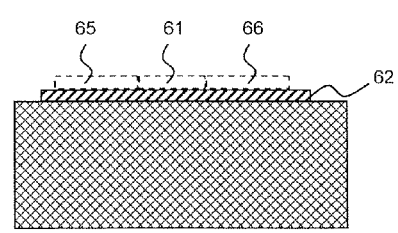

FIGS. 5Aa-5Cb are conceptual diagrams illustrating a forming method of the HMS detecting element 6. FIGS. 5Aa, 5Ba, and 5Ca illustrate top views from the perspective of the upper side in the lamination direction, and FIGS. 5Ab, 5Bb, and 5Cb illustrate cross-sectional views cut by the lines A-A respectively in FIGS. 5Aa, 5Ba, and 5Ca. The line A-A indicates a surface that appears by a polishing process, which will be described below, in other words, the air bearing surface S. First, the first protective film 62 is formed as illustrated in FIGS. 5Aa and 5Ab. In FIG. 5Ab, which is the cross-section surface from the perspective of the line A-A, the first protective film 62 is formed to have a length with which the first protective film 62 completely contains the resistance film 61 and a pair of electrode films 65 and 66 to be formed next and with which both sides of the first protective film 62 are formed to protrude outside the electrode films 65 and 66. In the first protective film 62, a planar shape thereof is not particularly restricted; however, it is preferred that the first protective film 62 be formed with a shape and length that can completely contain the resistance film 61 and the pair of electrode films 65 and 66 (see FIG. 5Aa). Accordingly, the resistance film 61 and the pair of the electrode films 65 and 66 can be formed in a flat shape.

Figure 5B:
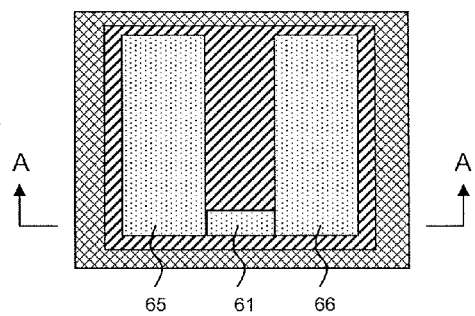
Figure 5B:
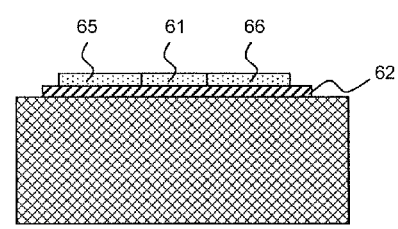

Next, as illustrated in FIGS. 5Ba and 5Bb, the resistance film 61 and the pair of electrode films 65 and 66 are formed on the upper surface of the first protective film 62. When these films 61, 65, and 66 are formed of the same material, the formation can be conducted by forming a resist on the portion where the resistance film 61 and the pair of electrode films 65 and 66 should be formed after forming a material film, and removing the material film that is not covered by the resist.

Figure 5C:
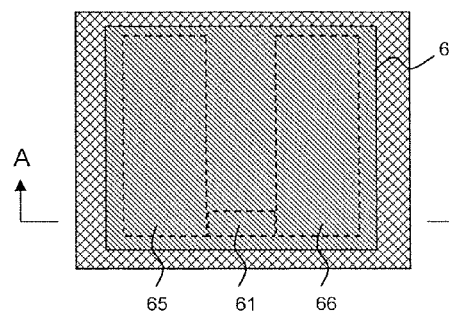
Figure 5C:
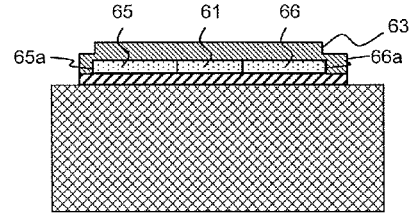

Next, the second protective film 63 is formed as illustrated in FIGS. 5Ca and 5Cb. In FIG. 5Cb, which is the cross-section surface as viewed by the line A-A, the second protective film 63 is formed to have length with which the second protective film 63 completely contains the resistance film 61 and the pair of electrode films 65 and 66 and with which both sides of the second protective film 63 are formed to protrude outside the electrode films 65 and 66. In this case, the portion that is outside the electrode films 65 and 66 of the second protective film 63 preferably completely covers both lateral surfaces 65a and 66a of the electrode films 65 and 66 in the track width direction (see FIG. 5Cb). In the second protective film 63, a planar shape thereof is not particularly restricted; however, it is preferred that the second protective film 63 be formed with a shape and length that can completely contain the resistance film 61 and the pair of electrode films 65 and 66 (see FIG. 5Ca).

Next, the wafer where each of the above-described layers is formed is cut in a bar where the magnetic head slider 1 is aligned in line, and the cut plane surface is polished and milling is further conducted. The milling is a process to irradiate various ion gases such as Ar or the like onto the cut plane surface as a milling beam to planarize the cut plane surface, and the incident angle of the milling beams is varied by several steps at the time of the milling process. Accordingly, the line A-A illustrated in FIGS. 5Aa, 5Ba, and 5Ca, which is to say, the air bearing surface S appears. Thereafter, the air bearing surface S is cleaned and the bars are separated into individual magnetic head sliders 1.

Figure 6A:
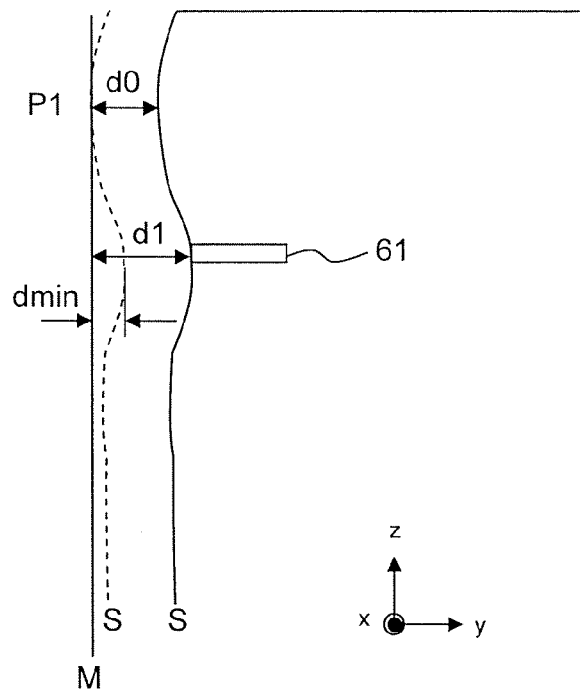
FIGS. 6A and 6B are conceptual diagrams illustrating asperity of the air bearing surface.
Figure 6B:
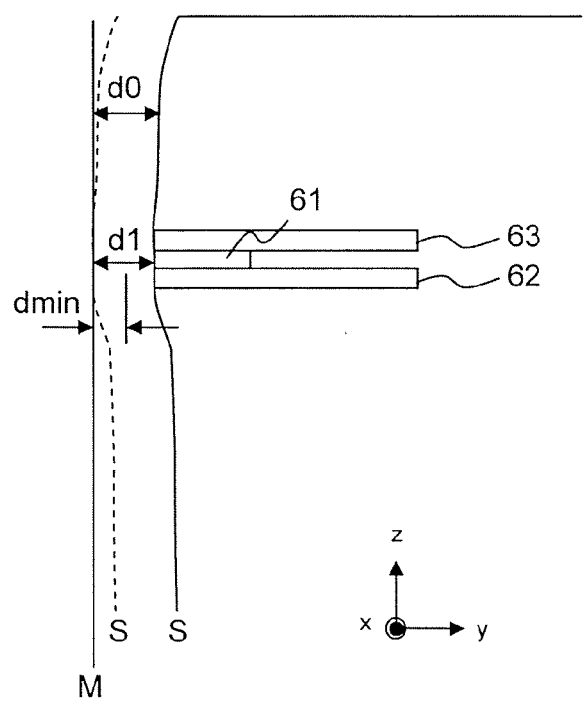

FIGS. 6A and 6B are drawings from the perspective of the same direction as FIG. 2 of the shape of the air bearing surface S obtained by polishing in the magnetic head slider where the first and second protective films 62 and 63 are not formed, and in the magnetic head slider where the first and second protective films 62 and 63 are formed, respectively. The solid line indicates a profile of the air bearing surface S when heater output is zero, and the broken line indicates a profile of the air bearing surface S when the heater output is increased and any point of the air bearing surface S contacts the recording medium M. Thermal deformation mode of the air bearing surface S differs according to the position of the heater 8 or the like; however, it is assumed here that the air bearing surface S shifts as a whole to the left in parallel. A protective film such as a diamond like carbon or the like may be formed on the air bearing surface S after polishing. Even in such case, the profile of the air bearing surface S as a whole changes minimally.

According to the description above, the magnetic head slider 1 is formed in a multilayer body formed with a plurality of layers, and the plurality of layers that appear in the cut plane surface are polished simultaneously and further milled. The milling rate for each layer depends on the material of each layer or the like, and normally differs from one another. Here, the milling rate indicates a thickness (length in the y-direction) of each layer that is removed by milling per unit time.

The milling rate generally has a negative correlation with the hardness of the portion to be milled. Therefore, a portion having a small milling rate is hard to be milled, and there is a tendency to project in the direction closer to the recording medium M side in comparison with other portions after milling. A portion having a high milling rate is easy to be milled, and there is a tendency to recess in the direction separating from the recording medium M in comparison with other portions after milling. In an example illustrated in FIG. 6A, the portion at the resistance film 61 is recessed more than other portions on the air bearing surface S. On the contrary, in an example illustrated in FIG. 6B, because the resistance film 61 is covered by the first and second protective films 62 and 63, the milling rate of the resistance film 61 is decreased. Accordingly, the portion where the resistance film 61 is positioned, relatively projects as compared to FIG. 6A.

Here, description is given of an HMS measuring method using the HMS detecting element 6. The resistance film 61 has a temperature dependence of electrical resistance, and the electrical resistance increases as temperature raises. Therefore, when a current flows from the electrode films 65 and 66 to the resistance film 61, the higher the temperature of the resistance film 61 is, the larger the voltage drop $\Delta V$ in the resistance film 61 is. In other words, the larger the voltage drop $\Delta V$ in the resistance film 61 is, the higher the temperature of the resistance film 61 is. On the other hand, the magnetic head 2 has a higher temperature than the recording medium M due to thermal generation of the heater 8 or the like; when the thermal generation of the heater 8 is increased, the magnetic head 2 rises to even a higher temperature and gets closer to the recording medium M (HMS decreases). In short, as the temperature of the resistance film 61 increases, the HMS becomes smaller. Therefore, there is a correlation between the voltage drop ΔV and a HMS change Δy. This relationship is given as follows by the Wallace equation. Here, n is an order of a harmonic signal that is applied to the HMS detecting element 6, and λ is a wavelength of the n-th harmonic signal.

$$\Delta y = \frac{\lambda}{54.6n} \Delta V \text{ (dB)}$$

In the case where the HMS is measured by the HMS detecting element 6, it is preferred to find the voltage drop ΔV0 where the HMS is zero in advance. Specifically, when the output of the heater 8 is increased, the magnetic head 2 and the recording medium M contact. At this moment, a large thermal generation occurs by friction and the voltage drop ΔV increases rapidly. By taking advantage of this phenomenon, the voltage drop ΔV0 where the HMS is zero can be found. The HMS detecting element 6 is calibrated having the ΔV0 as the standard value. Accordingly, a relational expression between the voltage drop ΔV and the HMS can be obtained.

When the voltage drop reaches the ΔV0, the output of the heater 8 cannot be increased any further because the magnetic head 2 and the recording medium M are in contact. Therefore, the output of the heater 8 must be controlled within this range. In FIG. 6A, the air bearing surface S is projected the most at a position P1 that is different from the resistance film 61, and the HMS becomes zero when the air bearing surface S contacts the recording medium M at the position P1. At that time, the resistance film 61 is separated by a distance dmin to the recording medium M, and the resistance film 61 cannot be closer to the recording medium M with the distance shorter than the distance dmin. In short, the distance dmin is the minimum separation distance between the resistance film 61 and the recording medium M. The minimum separation distance between the resistance film 61 and the recording medium M largely influences the sensitivity of the HMS detecting element 6. Even a degree of 1 nm largely decreases the sensitivity of the HMS detecting element 6.

Figure 7:
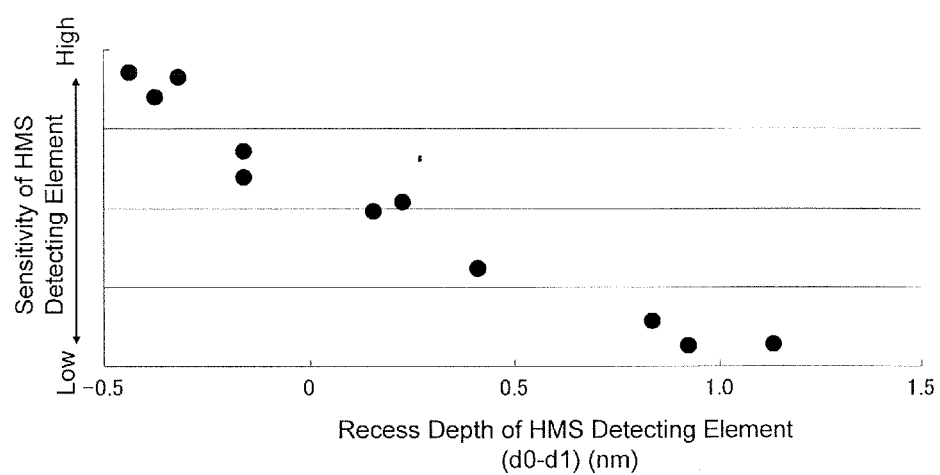
FIG. 7 is a graph illustrating the relationship between the recess depth and the sensitivity of the HMS detecting element.

FIG. 7 illustrates a relationship between the position and the sensitivity of the HMS detecting element 6. Zero "0" on the horizontal axis indicates a relative position in the y-direction of the HMS detecting element 6 with respect to the position P1 that is the most projected position of the air bearing surface S with the exception of the HMS detecting element 6. When the HMS in the position P1 is d0, the HMS in the HMS detecting element 6 is d1, the horizontal axis of the graph is dmin=d1−d0. In the region where the dmin is negative, the air bearing surface S is projected the most in the position of the HMS detecting element 6; and in the region where the dmin is positive, the air bearing surface S is projected the most in the position P1. FIG. 6A corresponds to the region where the dmin is positive.

On the contrary, in FIG. 6B, the first and second protective films 62 and 63 are provided in the periphery of the resistance film 61, and the resistance film 61 is protected at the time of polishing. Accordingly, the resistance film 61 can be closer to the recording medium M to reduce the distance dmin. For this reason, the sensitivity of the HMS detecting element 6 is increased and the HMS can be measured with a high degree of accuracy. Thereby the measurement error of the HMS can be set small and heater output can be further increased. As is apparent from FIG. 7, a high sensitivity can be obtained because the dmin is negative.

Figure 8:
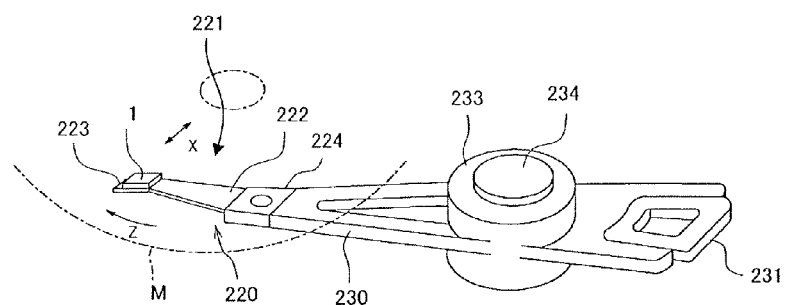
FIG. 8 is a perspective view of a head arm assembly of the present invention.

Next, with reference to FIGS. 8-10, description will be given of a head gimbal assembly on which the above-described magnetic head slider is mounted, a head stack assembly, and a hard disk drive device. Referring to FIG. 8, a head gimbal assembly 220 is provided with the magnetic head slider 1 and a suspension 221 elastically supporting the magnetic head slider 1. The suspension 221 is provided with a load beam 222, a flexure 223, and a base plate 224. The load beam 222 is formed of stainless steel in a plate spring shape. The flexure 223 is arranged at an end part of the load beam 222. The base plate 224 is arranged at the other end part of the load beam 222. The magnetic head slider 1 is joined to the flexure 223 to give the magnetic head slider 1 suitable flexibility. At the part of the flexure 223 to which the magnetic head slider 1 is attached, a gimbal part is provided to maintain the magnetic head slider 1 in an appropriate orientation.

An assembly in which the head gimbal assembly 220 is mounted to an arm 230 is referred to as a head arm assembly. The arm 230 moves the magnetic head slider 1 in a track crossing direction x of the recording medium M. One end of the arm 230 is attached to the base plate 224. To the other end of the arm 230, a coil 231 that forms one part of a voice coil motor is attached. A bearing part 233 is provided in the middle part of the arm 230. The arm 230 is rotatably supported by a shaft 234 attached to the bearing part 233. The arm 230 and the voice coil motor for driving the arm 230 configure an actuator.

Figure 9:
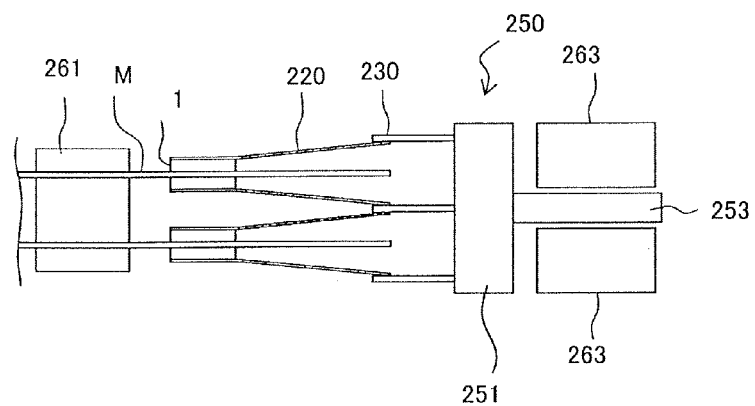
FIG. 9 is a side view of the head stack assembly of the present invention.
Figure 10:
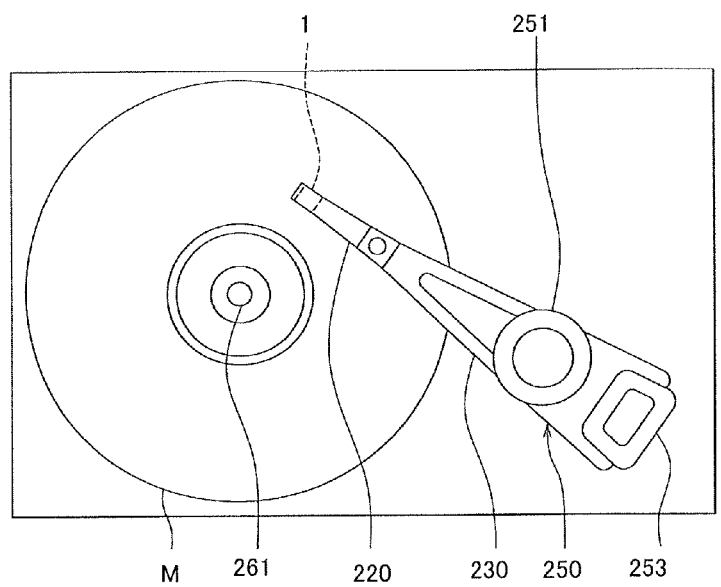
FIG. 10 is a plan view of a hard disk drive of the present invention.

Next, referring to FIG. 9 and FIG. 10, description is given of a head stack assembly in which the above-described magnetic head slider is integrated and the hard disk drive device. The head stack assembly is an assembly in which the head gimbal assembly 220 is attached to each of the arms of a carriage having a plurality of the arms. FIG. 9 is a side view of a head stack assembly. FIG. 10 is a plan view of the hard disk drive device. The head stack assembly 250 has a carriage 251 having a plurality of the arms 230. On each of the arms 230, the head gimbal assembly 220 is attached such that the head gimbal assemblies 220 align mutually at a distance in the vertical direction. On the side of the carriage 251, which is the opposite side to the arm 230, a coil 253 is mounted to be a part of the voice coil motor. The voice coil motor has permanent magnets 263 arranged so as to oppose each other through the coil 253.

Referring to FIG. 9, the head stack assembly 250 is integrated in the hard disk drive device. The hard disk drive device has multiple recording mediums M attached to a spindle motor 261. For each of the recording mediums M, two of the magnetic head sliders 1 are arranged so as to oppose each other sandwiching the recording medium M. The head stack assembly 250 except for the magnetic head slider 1 and the actuator correspond to a positioning device, support the magnetic head slider 1, and also position the magnetic head slider 1 with respect to the recording medium M. The magnetic head slider 1 is moved in the track crossing direction of the recording medium M by the actuator and is positioned with respect to the recording medium M. The magnetic head 2 included in the magnetic head slider 1 records information to the recording medium M by the magnetic recording part 5, and reproduces information recorded to the recording medium M by the reproducing part 4.

While preferred embodiments of the present invention have been shown and described in detail, and it is to be understood that variety of changes and modifications may be made without departing from the spirit of scope of the following claims or its scope.

What is claimed is:

1. A magnetic head slider, comprising:
at least one of a magnetic recording part and a reproducing part, wherein
the magnetic head slider comprises a resistance film having temperature dependence of electrical resistance, the resistance film being positioned in the vicinity of an air bearing surface or on the air bearing surface, separately from the magnetic recording part and the reproducing part, and
the magnetic head slider further comprises at least one of
a first protective film with a smaller milling rate than the resistance film, the first protective film being positioned contacting a lower surface of the resistance film in a lamination direction of the magnetic head slider and on the air bearing surface, and
a second protective film with a smaller milling rate than the resistance film, the second protective film being positioned contacting an upper surface of the resistance film in the lamination direction of the magnetic head slider and on the air bearing surface.

2. The magnetic head slider according to claim 1, wherein the first protective film or the second protective film has a smaller milling rate than all other portions on the air bearing surface.

3. The magnetic head slider according to claim 1, comprising:
both the first protective film and the second protective film.

4. The magnetic head slider according to claim 2, wherein the first protective film completely covers the lower surface of the resistance film and the second protective film completely covers the upper surface of the resistance film on the air bearing surface.

5. The magnetic head slider according to claim 4, comprising:
a pair of electrode films that are connected to both lateral surfaces of the resistance film in the track width direction of the magnetic head slider, wherein
the second protective film covers outside lateral surfaces of the electrode films respectively in the track width direction on the air bearing surface.

6. The magnetic head slider according to claim 1, wherein the air bearing surface projects the most in a direction orthogonal to the lamination direction in a portion where one of the resistance film, the first protective film and the second protective film is positioned.

7. The magnetic head slider according to claim 1, wherein the resistance film is composed of a metallic film containing a metal selected from a group that includes nickel, titanium, tungsten, platinum, tantalum, ruthenium, and gold as a main component, a metallic film containing two or more elements selected from the group as main components, or a lamination film containing these metallic films.

8. The magnetic head slider according to claim 7, wherein the first and second protective films contain any one or more of titanium oxide, aluminum oxide, hafnium oxide, zirconium oxide, chrome oxide, or niobium oxide as a main component.

9. A magnetic head slider, comprising:
at least one of a magnetic recording part and a reproducing part; and
an air bearing surface that is polished; wherein
the magnetic head slider comprises a resistance film having temperature dependence of electrical resistance, the resistance film being positioned in the vicinity of the air bearing surface or on the air bearing surface, separately from the magnetic recording part and the reproducing part,
the magnetic head slider further comprises at least one of
a first protective film that is milled with a smaller milling rate than the resistance film, the first protective film being positioned contacting an lower surface of the resistance film in a lamination direction of the magnetic head slider and on the air bearing surface, and
a second protective film that is milled with a smaller milling rate than the resistance film, the second protective film being positioned contacting an upper surface of the resistance film in the lamination direction of the magnetic head slider and on the air bearing surface.

10. A magnetic head slider, comprising:
at least one of a magnetic recording part and a reproducing part; and
an air bearing surface that is polished, wherein
the magnetic head slider comprises a resistance film having temperature dependence of electrical resistance, the resistance film being positioned in the vicinity of the air bearing surface or on the air bearing surface, separately from the magnetic recording part and the reproducing part, and
at least a part of the periphery of the resistance film on the air bearing surface is covered with a protective film with a higher Vickers hardness than the resistance film.

11. A head gimbal assembly, comprising:
the magnetic head slider according to claim 1.

12. A hard disk drive device, comprising:
the magnetic head slider according to claim 1.

13. The magnetic head slider according to claim 1, wherein the resistance film is positioned downstream of the reproducing part in an upward lamination direction.

14. The magnetic head slider according to claim 1, wherein the resistance film and at least one of the first protective film and the second protective film form a part of a head-to-medium spacing (HMS) detecting element configured to detect a space between the magnetic head slider and a surface of a recording medium.

* * * * *